United States Patent [19]

Malcolm

[11] Patent Number: 4,662,126

[45] Date of Patent: May 5, 1987

[54] VIBRATION RESISTANT EXPLOSION CONTROL VENT

[75] Inventor: Eddie R. Malcolm, Independence, Mo.

[73] Assignee: Fike Corporation, Blue Springs, Mo.

[21] Appl. No.: 866,884

[22] Filed: May 23, 1986

[51] Int. Cl.$^4$ ............................................. E04H 9/00
[52] U.S. Cl. ........................................... 52/1; 52/89; 52/309.9; 52/232; 220/89 A
[58] Field of Search ................ 52/1, 309.9, 89, 792, 52/809, 232; 220/89 A

[56] References Cited

U.S. PATENT DOCUMENTS

| | | | |
|---|---|---|---|
| 3,088,478 | 5/1963 | Schimmel | 220/89 A X |
| 3,091,359 | 5/1963 | Wood | 220/89 A |
| 3,783,563 | 1/1974 | Moore | 52/309.9 X |
| 3,972,442 | 8/1976 | Malcolm | 220/89 A |
| 4,067,154 | 1/1978 | Fike, Jr. | |
| 4,342,988 | 8/1982 | Thompson et al. | 220/89 A X |
| 4,498,261 | 2/1985 | Wilson et al. | 52/1 |

Primary Examiner—Carl F. Friedman
Attorney, Agent, or Firm—Schmidt, Johnson, Hovey & Williams

[57] ABSTRACT

A burst panel assembly for normally covering a vent opening of structure which defines an area to be protected from the buildup of dangerously high internal pressures has two frangible panels disposed in spaced, face-to-face relationship along with a core of expanded polyurethane foam which functions to dampen vibrations received from the structure and transmitted to the frangible panels. The foam is introduced in an initially flowable condition into the space between the panels and thereafter expands while curing to a solidified configuration for continuously exerting pressure on both of the panels, to thereby substantially reduce the fatigue stress that would otherwise occur along lines of weakness of burst patterns that are formed in both of the panels. In a preferred method of construction of the burst panel assembly, pressurized air is initially introduced into the space between the panels to shift one of the panels outwardly to a pre-bulged configuration, and subsequently a negative pressure is applied to the outside face of the opposite panel to shift the same in an outward direction while filling the space with the initially flowable foam material, so that the foam expands to a configuration larger than would be otherwise possible and is subsequently "pre-stressed" against the same panel when the negative pressure is relieved. The foam material when cured strengthens the assembly by providing support to the central portions of the frangible panels, and also the foam is compressible and somewhat resilient so that vibrations transmitted to the frangible panels are effectively dampened. The burst panel assembly is particularly useful for protecting relatively low pressure equipment such as baghouses, dust collectors and dryers.

10 Claims, 3 Drawing Figures

VIBRATION RESISTANT EXPLOSION CONTROL VENT

BACKGROUND OF THE INVENTION

1. Field of the Invention

This invention relates to a burst panel assembly having two frangible panels disposed in spaced, face-to-face relationship with an initially flowable synthetic resin material that is disposed in the space between the panels and which expands while curing for continuously exerting pressure on both of the panels for subsequently dampening vibrations thereon. The panel assembly is particularly useful for venting dangerously high internal pressures in an area that is normally exposed to relatively low operating pressures, such as baghouses, dust collectors and the like.

2. Description of the Prior Art

Frangible panels and disks have long been used for providing a degree of protection to the chambers of vessels, structures or fluid conduits which are subject to the buildup of dangerously high internal pressures that are significantly greater than the operating pressures normally experienced within the structure. Frangible membranes or panels are constructed to burst when the pressure within the structure exceeds a predetermined amount, and thereby vent the area to preclude damage to the structure or to nearby operating personnel.

Burst panels are often used in association with dust collecting equipment, such as baghouses and cyclone-type separators. Additionally, burst panels are useful for protecting drying equipment such as, for instance, coal dryers and the like. Moreover, burst panels and membranes are often provided with lines of weakness which form a burst pattern to ensure that the panel will rupture along the predetermined pattern whenever the pressure within the area to be protected reaches a predetermined level. The weakness lines are typically constructed so that substantially the entire area of the vent opening is quickly exposed to atmosphere. Additionally, the weakness lines are usually formed to allow the panel to open without fragmenting which could otherwise cause panel fragments to be projected from the vent opening during a high pressure explosion at speeds that are extremely dangerous to nearby personnel.

Unfortunately, one problem that has long been associated with burst membranes assemblies is premature failure of the membrane due to vibration that is caused by the equipment or structure to be protected. Commonly, vibration from the equipment causes fatigue stress along the lines of weakness of the frangible membranes, particularly where the weakness lines comprise elongated slots that are separated by relatively narrow tabs which flex repeatedly under vibration until the material comprising the tabs reaches its fatigue limit and breaks. As a result, the burst panel will thereafter open at a pressure substantially below the desired burst pressure, enabling materials within the structure or the equipment to accidentally escape to the atmosphere, often without the knowledge of the operator.

For instance, vibration emanating from equipment associated with baghouses often causes such severe stress on the burst panels that the latter prematurely fracture within three days of use. Obviously, there is a serious need for a burst panel assembly that can withstand vibration over extended periods of time while providing full protection against dangerously high pressure buildups that exceed a constant, prespecified amount.

SUMMARY OF THE INVENTION

The present invention overcomes the abovenoted disadvantages of prior art burst panel structures by provision of a panel assembly that can withstand repeated, extended vibration and instantaneously open to quickly and completely vent the equipment to be protected whenever internal pressures exceed a predetermined amount. At the same time, the burst panel assembly includes frangible portions having lines of weakness to ensure that the panel ruptures along a specified burst pattern without breaking into dangerous fragments.

More particularly, the burst panel assembly of the present invention comprises two frangible panels that are disposed in spaced, face-to-face relationship to each other to define a chamber between the two panels. An initially flowable, synthetic resin material is introduced into the chamber between the panels and is of a type to self-expand while curing to a solidified condition. As such, the synthetic resin material once cured is of an expanded configuration for continuously thereafter exerting pressure on both of the panels, and the compressible nature of the cured synthetic resin material dampens vibrations transmitted by the two panels.

In a preferred method of assembling the burst panel assembly, the chamber between the panels is initially pressurized to deform and shift one of the panels outwardly from the chamber. Next, a vacuum is applied to the face of the opposite panel for shifting the latter outwardly from the chamber while the synthetic resin material is introduced into the chamber. The application of a vacuum to one of the panels enables the synthetic resin material to expand to a slightly greater configuration than would otherwise be possible, and upon release of the vacuum, the resilient nature of the panel will urge the same into a position bearing against the cured synthetic resin material with a force that is somewhat higher than would otherwise would be possible.

The use of a synthetic resin material which expands during curing enables the material to shift into all areas, including the corners, of the chamber between the panels to ensure that the material when cured fills a substantial portion, if not all, of the chamber. Moreover, the self-expanding nature of the material provides a constant force or pressure that is uniformly distributed about the entire inner face of both panels. The material preferably comprises a polyurethane foam that is compressible and somewhat resilient for dampening vibrations experienced by the burst panels while exerting a continuous, uniform pressure to the inner faces of the same.

DETAILED DESCRIPTION OF THE DRAWINGS

Figure 2:
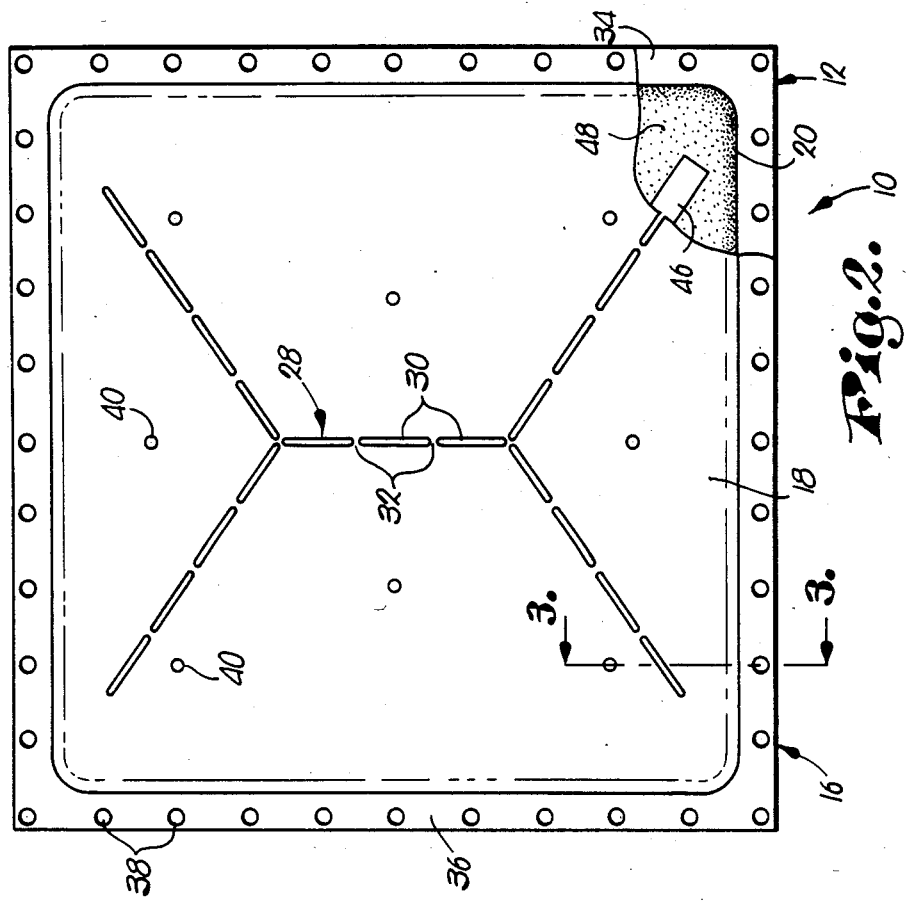
FIG. 2 is a bottom view of the burst panel assembly shown in FIG. 1 with a frangible panel broken away for clarity to reveal the polyurethane core.
Figure 3:
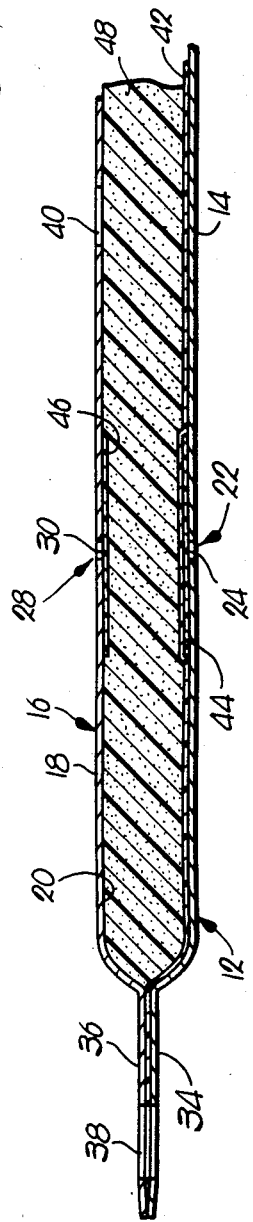
FIG. 3 is an enlarged, fragmentary, cross-sectional view taken along line 3—3 of FIG. 2.
Figure 1:
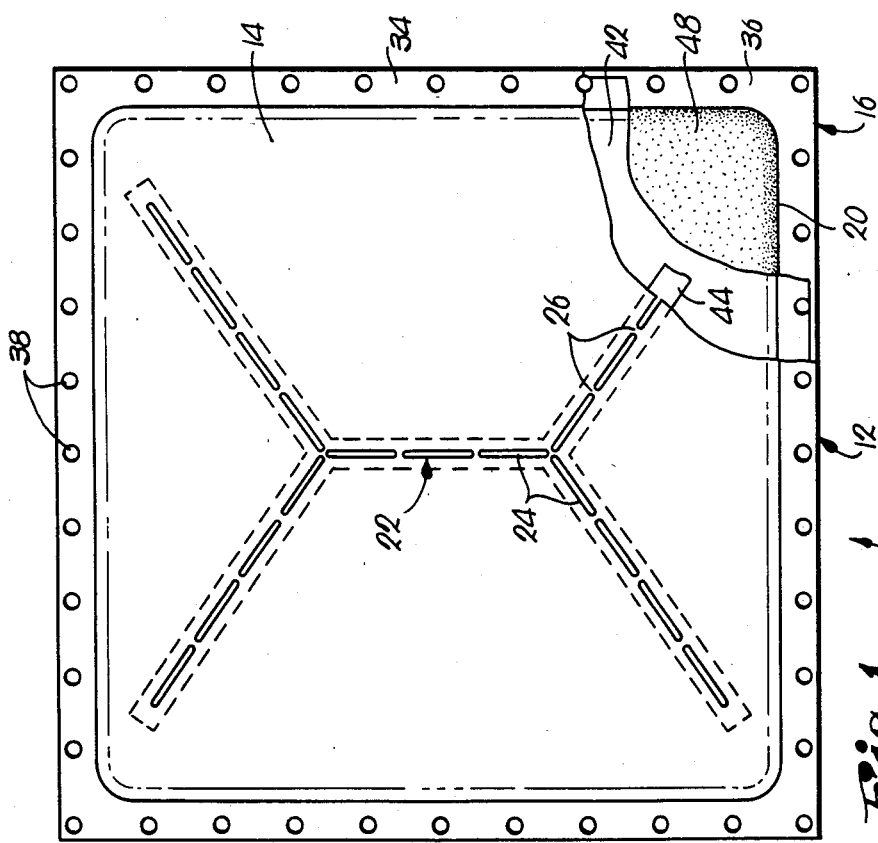
FIG. 1 is a top view of the vibration resistant burst panel assembly of the present invention, with parts broken away to reveal an internal flexible membrane and a filled core comprising polyurethane foam.

A vibration resistant burst panel assembly 10, as shown in FIGS. 1-3, is adapted to normally cover a vent opening of a structure (not shown) defining an area which is to be protected from the buildup of dangerously high internal pressures, wherein the structure is subject to vibrations from motors or other moving machinery. Although the burst panel assembly 10 as illustrated for exemplary purposes is normally associated with structures such as baghouses that normally operate at relatively low pressures, such as fifteen pounds per square inch and below, it is to be understood that the principles of the present invention can also be employed for use with frangible membranes such as rupture disks that are often used on reaction vessels and the like and normally seal the vessel at substantially higher operational pressures.

The burst panel assembly 10 has a first panel 12 (FIGS. 1 and 3) with a frangible portion 14 for extension across the vent opening of the structure to be protected. A second panel 16 (FIGS. 2 and 3) has a frangible portion 18 disposed in spaced, face-to-face relationship to the frangible portion 14 of the first panel 12 to define a chamber 20 between the frangible portions 14,18.

Viewing FIG. 1, the first panel 12 has a burst pattern 22 of a configuration as shown and comprising lines of weakness which include a number of elongated slots 24 with relatively narrow tabs 26 of the frangible portion 14 between each adjacent pair of slots 24. Similarly, as depicted in FIG. 2, the frangible portion 18 of the second panel 16 has a burst pattern 28 comprising lines of weakness which include a plurality of elongated slots 30 with relatively narrow tabs 32 of the frangible portion 18 located between the ends of adjacent slots 30. The burst pattern 28 of the second panel 16 is substantially in registration with the burst pattern 22 of the first panel 12.

Both of the panels 12,16 have marginal edge portions 34,36 respectively, and a number of holes 38 are formed around the entirety of the edge portions 34,36 for bolting the assembly 10 to a frame or the like surrounding the vent opening of the structure to be protected. Referring to FIGS. 2 and 3, the second panel 16 has a plurality of apertures 40, for purposes which will become clear hereinafter.

A relatively thin, flexible sheet 42, as shown in FIGS. 1 and 3, is disposed between the frangible portions 14,18 for substantially precluding leakage of pressurized fluid from the structure to be protected through the slots 24 in the first panel 12 and the slots 30 in the second panel 16. A slot cover 44 is aligned along the burst pattern 22 between the sheet 42 and the first panel 12 for protecting the sheet 42 from abrasive wear from the edges of the frangible portions 14 which define the slot 24, which edges can be relatively sharp in practice. The slot cover 44 is preferably a teflon film that is fixed to the first panel 12 by an adhesive, although a strip of metalic material may also be used for covering the slot 24. Viewing FIG. 2, a slot cover 46, similar to slot cover 44, lies against the inner face of the frangible portion 18 to cover slot 30 in the second panel 16.

A core of initially flowable, cured synthetic resin material 48 fills the chamber 20 and is of a type which self-expands while curing to a solidified condition. The material 48 in the solidified condition is expanded to a configuration for continuously exerting pressure directly on the frangible portion 14 of the first panel 12, as well as directly to the sheet 42 which in turn transmits the pressure from the material 48 to the frangible portion 18 of the second panel 16. The material 48 once cured is compressible and somewhat resilient for dampening vibrations transmitted by the panels 12,16 in order to substantially reduce fatigue stress that would otherwise be exerted on tabs 26,32 and likely prematurely rupture the latter.

The preferred composition of the synthetic resin material 38 is a low density polyurethane foam sold under the name Instapak ®-40 manufactured by Sealed Air Corporation of Danbury, Conn. Typically, polyurethane foams such as Instapak ®-40 are prepared by reacting a polymeric isocyanate with a hydrogen-containing compound having a reactive hydroxyl group, such as polyoxyalkylated glycol. The reaction occurs in the presence of a catalyst, and a blowing agent, such as chlorofluorocarbon is added which vaporizes at the outset of the reaction to produce an expanded, cellular product. The blowing agent vaporizes at a temperature well below the temperature reached during the reaction of the isocyanate and polyoxyalkylated glycol, and the latter reaction is exothermic and thus supplies the heat for vaporization of the blowing agent necessary to form the expanded foam product. Polyurethane foam systems are commonly supplied in two components, the isocyanate component being maintained separate from the polyoxyalkylated glycol-catalyst-blowing agent component until the time of use.

In preferred forms of the invention, the polyurethane foam material 48 has a free-rise core density of less than four pounds per cubic foot. However, better results are observed when the polyurethane foam 48 has a free-rise core density less than about one pound per cubic foot, and best results have been observed by utilization of the foam manufactured under the name Instapak ®-40 which has a free-rise core density of 0.40 pounds per cubic foot. The relatively low density of the preferred foam 48 reduces the weight of the latter which would otherwise be carried by the panels 12,16 and consequently cause unnecessary stress to be exerted on tabs 26,32.

In practice, good results have been observed when the average thickness of the cured polyurethane foam 48 on the chamber 20 is in the range of about ten times to about 50 times the thickness of either of the frangible portions 14,18. However, better results have been observed when the average thickness of the cured polyurethane foam 48 is in the range of about eighteen times to about thirty times the thickness of the frangible portions 14,18. The panels 12,16 are formed of a flexible, metalic material such as aluminum or stainless steel, the thickness of the latter preferably being approximately 0.018 inch for a panel of approximately 14"×14", or approximately 0.037 inch for a larger panel of approximately forty-four inches square.

In the preferred method of assembling the burst panel assembly 10, the sheet 42 is placed between the panels 12,16 which are then secured to each other in aligned relationship by a plurality of spot welds or the like. The panels 12,16 are then clamped in a fixture, and pressurized air is next directed in the apertures 40 to pressurize the chamber 20 and shift the second panel 16 outwardly away from the chamber 20 to a bulged configuration. During the time that pressurized air is directed into the chamber 20, sheet 42 precludes leakage of air through slots 24, and slot cover 46 substantially prevents the escape of air through slots 30.

Next, the air pressure within chamber 20 is vented to atmospheric, and a negative pressure of vacuum is applied to the outer face of the frangible portion 14 of panel 12 to shift the portion 14 outwardly in a direction away from chamber 20. During application of the vacuum to the first panel 12, the polyurethane foam material 48, being presently in a flowable condition, is directed through the apertures 40 and into the chamber 20. The foam material 48 expands rapidly upon entering the chamber 20, and once a sufficient quantity of the polyurethane foam 48 is introduced into each chamber 20, introduction of additional foam material ceases. The vacuum is continuously applied to the frangible portion 14 until the polyurethane foam material 48 is fully expanded and cured to a solidified condition, which typically ocurs within one minute of entering the chamber 20. Finally, the negative pressure is relieved and the inherent resiliency of the frangible portion 14 urges the latter to thereafter bear against the solidified foam material 48.

As can now be appreciated, the cured, expanded foam material 48 is of a configuration to provide an interference fit with the frangible portions 14,18 defining the chamber 20. A sufficient quantity of the foam material 48 is introduced into the chamber 20 to ensure that the material 48 when cured and expanded completely fills the entire chamber 20 and also bears uniformly across the entire area of the frangible portions 14,18. Moreover, by applying a negative pressure to the first panel 12 to shift the latter outwardly while introducing the foam material 48 into the chamber 20, the foam material 48 expands somewhat farther than would be otherwise possible to thereby "pre-stress" the cured foam material 48 thereafter against the frangible portion 14 once the application of negative pressure to the first panel 12 is ceased.

Once the foam material 48 is cured, the latter is somewhat rigid and provides strength to the assembly 10, possibly by functioning as a coupling member between the middle portions of panels 12,16. At the same time, the foam material 48 is compressible so that vibrations that are transmitted to either of the panels 12,16 from structure or equipment to which the assembly 10 is mounted are effectively dampened, thus relieving the relatively narrow tabs 26,32 from repeated vibratory flexing which could otherwise cause the tabs 26,32 to fracture due to fatigue stress.

In use of the assembly 10, the frangible portions 14,18 remain in an unruptured condition whenever the pressure within the area to be protected remains below a certain predetermined value, and the sheet 42 substantially precludes the leakage of pressurized materials through the assembly 10. However, as soon as the pressure within the area rises to exceed a certain value, both of the panels 12,16 simultaneously rupture along burst patterns 22,28 respectively and the frangible portions 14,18 thereafter shift outwardly to immediately vent the area within the structure or equipment to the atmosphere.

Advantageously, the first panel 12 is the pressure or working side of the assembly 10 which faces the area that is to be protected against the buildup of dangerously high pressures, while the second panel 16 presents the vent or atmospheric side of the assembly 10. As such, the sheet 42 which is preferably comprised of teflon normally prevents materials within the area of the structure or equipment from contacting the reacting with the polyurethane foam material 48. Where relatively high temperatures or combustile particulates are encountered, the teflon material normally comprising the slot cover 44 can be replaced with a metalic material.

Although the preferred method as set forth hereinabove utilizes both positive and negative pressures to bulge the panels 12,16 outwardly in opposite directions, it should be appreciated that the panels 12,16 may be pre-bulged by a forming process or, alternatively, bulged solely by the expansion of the foam material 48 within chamber 20.

I claim:

1. A vibration resistant burst panel assembly for normally covering a vent opening of structure defining an area which is to be protected from the buildup of dangerously high internal pressures, wherein said structure is subject to vibration that is at least partially transmitted to said burst panel assembly, said assembly comprising:

a first panel having a frangible portion for extension across the vent opening of said structure, a second panel having a frangible portion disposed in spaced, face-to-face relationship to said frangible portion of said first panel to define a chamber between said frangible portions; and an initially flowable, cured synthetic resin material filling at least a substantial portion of said chamber and being self-expanding while curing to a solidified condition, said material in said solidified condition in said chamber being expanded to a configuration for continuously exerting pressure on said frangible portion of said first panel and on said frangible portion of said second panel, said cured material being compressible for dampening vibrations transmitted by said first and second panels.

2. The invention of claim 1, wherein said material comprises a polyurethane foam.

3. The invention of claim 1, wherein said frangible portions of said first panel and said second panel each have lines of weakness defining a burst pattern.

4. The invention of claim 3, wherein said lines of weakness comprise slots; and including a thin, flexible sheet disposed between said frangible portions of said first panel and said second panel for substantially precluding leakage of fluid through said slots in said first panel and said second panel.

5. The invention of claim 4, including cover member extending across at least a portion of said slots for preventing damage to said flexible sheet.

6. The invention of claim 1, wherein said synthetic resin material has a thickness in the range of about ten times to about fifty times the thickness of said frangible portion of said first panel.

7. The invention of claim 6, wherein said synthetic resin material has a thickness in the range of about eighteen times to about thirty times the thickness of said frangible portion of said first panel.

8. The invention of claim 1, wherein said synthetic resin material has a free-rise density of less than approximately 4.0 pounds per cubic foot.

9. The invention of claim 8, wherein said synthetic resin material has a free-rise density of less than approximately 1.0 pounds per cubic foot.

10. The invention of claim 9, wherein said synthetic resin material has a free-rise density of approximately 0.40 pounds per cubic foot.

* * * * *